United States Patent Office 3,781,405
Patented Dec. 25, 1973

3,781,405
METHOD OF REMOVING DISSOLVED FERRIC IRON FROM IRON-BEARING SOLUTIONS
Robert William Allan, Moonah, Curzon John Haigh, Lindisfarne, and John Hamdorf, Howrah, Tasmania, Australia, assignors to Electrolytic Zinc Company of Australia Limited, Melbourne, Victoria, Australia
Filed Feb. 10, 1971, Ser. No. 114,293
Claims priority, application Australia, May 15, 1970, 1,223/70
Int. Cl. C01g 49/02
U.S. Cl. 423—142                    6 Claims

ABSTRACT OF THE DISCLOSURE

Aqueous acidic solutions containing dissolved ferric iron, together with any one or more of the cations zinc, copper, cobalt or nickel, such solutions having been prepared by the acid leaching of ores, concentrates, calcines, or residues containing iron and zinc, copper, cobalt or nickel, are treated to precipitate the iron in a form possessing greatly enhanced settling and filtering properties. The precipitation of the iron in this easily separable form is conducted in an agitated reaction vessel to the contents of which are added the ferric iron bearing aqueous acidic solution and a neutralizing agent so that in the reaction vessel the dissolved ferric iron concentration is maintained at less than 1 gram per litre, the pH is maintained in the range 1.7 to 3.5, and the temperature is maintained in the range 50° C. to the boiling point.

---

Figure 1:
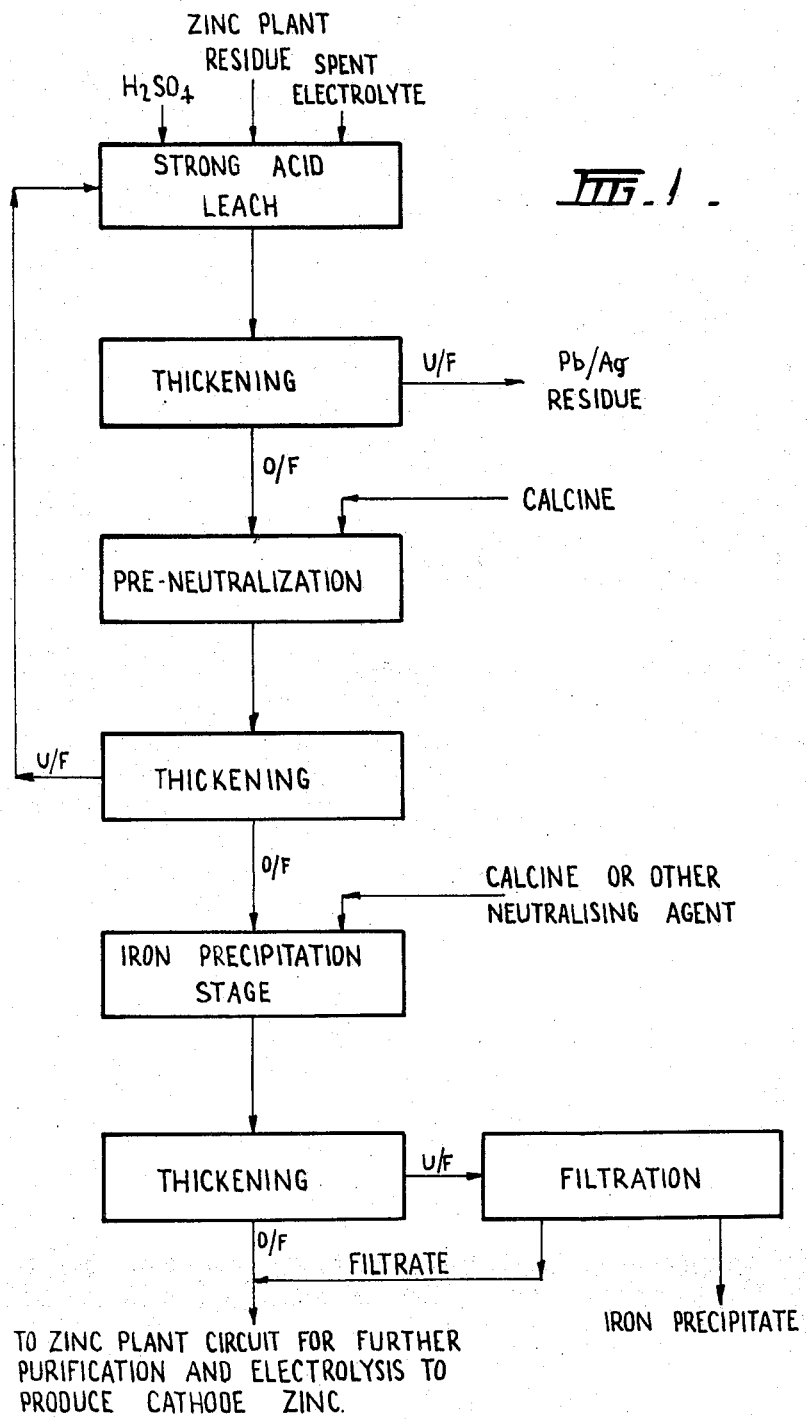

This invention relates to a process for the separation of dissolved ferric iron from iron-bearing solutions, and particularly from metal sulphate and/or metal chloride solutions. The process applies particularly to zinc sulphate solutions, containing dissolved ferric iron, prepared by leaching in sulphuric acid solutions residues or calcined zinc concentrates which contain a substantial proportion of zinc ferrite. The invention also applies to the separation of ferric iron from sulphate and/or chloride solutions containing valuable metals such as nickel, cobalt and copper.

In this specification and in the appended claims:

g./l.=grams per litre
mg./l.=milligrams per litre
lb./ton=pounds (avoirdupois) per ton
cm./min.=centimetres per minute
cc./min.=cubic centimetres per minute
tons/sq. ft.=tons per square foot
gal./hour=gallons per hour
S.G.=specific gravity
mm.=millimetres
O/F=thickener overflow
U/F=thickener underflow neutralizing agent—a basic material which can react with an acid solution to raise the pH In the recovery of metals such as cobalt, copper, nickel and zinc from ores, concentrates and other raw materials, it is often necessary to separate dissolved ferric iron from sulphate and/or chloride solutions of the metals because the dissolved ferric iron interferes with the subsequent recovery steps.

We have discovered an improved method of separating dissolved ferric iron from iron-bearing solutions, particularly metal sulphate and/or metal chloride solutions. The method we have discovered is not limited to solutions containing only a small amount of dissolved ferric iron but can be applied equally well to solutions containing substantial concentrations of ferric iron, for example, in excess of 30 grams per litre.

We have found that by proper control of the rate of mixing of a solution containing dissolved ferric iron and of a neutralizing agent so as to maintain the pH within the range 1.5 to 4.0, and the temperature within the range 50° C. to the boiling point at atmospheric pressure, we can precipitate substantially all of the dissolved iron in a form which can be readily thickened, filtered and washed substantially free from entrained sulphate and/or chloride solution.

According to the present invention there is provided a process for removing ferric iron from a solution containing dissolved ferric iron which includes the step of treating the said solution with a neutralizing agent so as to precipitate ferric iron in a form readily separable by conventional techniques, characterized in that the said solution and the said neutralizing agent are reacted in a vessel or vessels, the pH of the pulp so obtained is maintained within the pH range 1.5 to 4.0, the dissolved ferric iron concentration in the said pulp is maintained at not more than 5 g./l., and the temperature of the pulp is maintained at a temperature in the range 50° C. to the boiling point of the pulp at atmospheric pressure.

In a preferred form of the invention the solution containing dissolved ferric iron and a suitable neutralizing agent are added at controlled rates with agitation so that the pH of the pulp so obtained is maintained in the pH range 1.7 to 3.5 and more preferably in the pH range 2.0 to 3.0, the resulting dissolved ferric iron concentration in the pulp is less than 1 g./l., and the temperature of the pulp is maintained in the range 65° C. to 95° C.

One way of operating the process of this invention is to maintain the flow of solution containing dissolved ferric iron into a reaction vessel at a constant rate. The rate will be determined by the concentration of ferric iron in the feed solution and the size of the reaction vessel. We have found, for example, that with a reaction vessel of capacity 3.7 litres a constant flow rate in the range 12 to 20 cc./min. is satisfactory for a solution containing 25 g./l. of ferric iron. The rate of addition of a suitable neutralizing agent to maintain the pH of the resulting pulp in the range 1.5 to 4.0 is then controlled by established techniques.

We have found, for example, that the addition of the neutralizing agent as a slurry of finely divided solids in water can be conveniently controlled by a metering pump or a variable flow splitter or similar device for controlling the flow rates of slurries. Alternatively, the neutralizing agent can be added as a dry solid, for example, by a screw feeder or similar device, the rate of addition being varied by altering the speed of the screw. The rate of addition of the neutralizing agent can be controlled manually or by means of a suitable instrument actuated by a signal from a pH controller, the electrodes of which are immersed in the reaction mixture, so as to maintain the pH of the mixture in the desired range.

The method of operating the process of the invention is not restricted, however, to the examples cited above. Thus, the process can be operated equally well by maintaining constant the rate of addition of a suitable neutralizing agent while varying the flow of solution containing dissolved ferric iron to maintain the pH of the mixture in the range 1.5 to 4.0 and the iron concentration in the reaction mixture at not more than 5 g./l.

Alternatively, the rates of addition of solution containing dissolved ferric iron and the neutralizing agent can both be varied to obtain the desired conditions.

The design of the reaction vessel is not critical. However, it is important that the contents of the vessel should be adequately agitated to allow rapid mixing of the reactants. The vessel should also be fitted with a means for heating and maintaining the reaction mixture in the desired temperature range.

The pulps obtained by operating the process of the invention can be readily flocculated by the addition of a suitable flocculant. We have found, for example, the addition of a high molecular weight polyacrilamide flocculant such as the material sold under the trade name Separan M.G.L. at a dosage of 0.2 lb./ton of solids, to be effective. The flocculated pulps settle rapidly and the settled solids possess good filtration properties. We have obtained with sulphate solutions, for example, initial settling rates of flocculated pulps of up to 6 cm./min. and filtration rates of up to 1.1 tons per sq. ft. per day of dry solids. With chloride solutions settling rates of up to 20 cm./min. and filtration rates of up to 1.7 tons per sq. ft. per day of dry solids have been obtained.

The physical form of the precipitate appears to have an effect on the thickening and filtration properties. We have found, for example, that excessive agitation has a deleterious effect on the settling and filtration rates. With chloride solutions the addition of a small amount of sulphate has a beneficial effect on the settling rate.

The chemical composition of the iron precipitates obtained by the method of the invention varies considerably depending on the type of solution, the pH of precipitation, the temperature of precipitation, and the type and chemical composition of the neutralizing agent used.

The process of this invention is particularly suited to continuous operation in one or more vessels. However, the process can be operated batchwise if desired.

The process of the invention can be applied with particular advantage in the hydrometallurgical recovery of zinc. The raw material most commonly used for zinc production is zinc oxide calcine, produced by roasting zinc sulphide concentrates. Although the procedures used for leaching such calcined zinc concentrate in spent electrolyte vary from one plant to another, all these procedure have certain common features. Thus, the leaching conditions are carefully controlled so as to obtain maximum solubility of zinc, while minimizing the dissolution of iron from the said calcine. Leaching of calcine may be conducted batchwise or continuously, co-currently or counter-currently and over a temperature range from 40° C. to 100° C. Following the leaching step the undissolved residue, termed zinc plant residue, is separated from the leach solution which is then purified by established procedures and the zinc recovered by electrolysis.

During the roasting of a zinc sulphide concentrate portion of the zinc reacts with any iron present to form zinc ferrite ($ZnO.Fe_2O_3$). Under the usual leaching procedures operating in electrolytic zinc plants, conditions are carefully controlled to avoid dissolving large quantities of iron. This is because of the difficulties encountered in separating the dissolved iron from the zinc sulphate solution. Consequently very little of the zinc ferrite present in calcine is dissolved and it reports in the zinc plant residue. As a result, the overall zinc recovery from the leaching of calcine in electrolytic zinc plants is usually in the range 87% to 93%, the limitations in recovery depending principally on the quantity of zinc ferrite formed in the roasting step.

By applying the process of the invention it has been possible to develop new ways, and to modify existing ways, of treating calcine and zinc plants residue so that the zinc ferrite contents can also be dissolved and the resulting solutions satisfactorily purified. By the application of the method of the present invention the dissolved ferric iron can be separated from the zinc sulphate solution, the solution further purified and the zinc recovered by established electrolytic procedures. As a result the overall zinc recovery from the leaching of calcine can be increased from within the range 87% to 93% to within the range 95% to 99%. For example, the process of this invention can with advantage be applied to solutions containing dissolved ferric iron produced by leaching zinc plant residue containing zinc ferrite in an excess of a sulphuric acid solution near the boiling point. The resulting solution will contain ferric sulphate, zinc sulphate and dissolved impurities such as arsenic, antimony, germanium and fluorine. The process of the present invention is particularly suitable for removing substantially all of the ferric iron from such leach solutions. FIG. 1 of the accompanying drawings illustrates one way in which the process of this invention can be applied.

To minimize the quantity of neutralizing agent which has to be added in the ferric iron precipitation stage it may be desirable to neutralize the excess acidity remaining after the leaching stage with a suitable neutralizing agent. One method of achieving this is to use calcine or other suitable neutralizing agent in a pre-neutralization stage as shown in FIG. 1. Any ferric residue or undissolved calcine remaining after the pre-neutralization stage can be collected as thickener underflow and recycled back to the residue leaching stage for further treatment.

After precipitating substantially all of the dissolved ferric iron from the residue leach solution by the process of the present invention the partially purified solution can rejoin the circuit of an electrolytic zinc plant for further purification and recovery of contained zinc.

Figure 2:
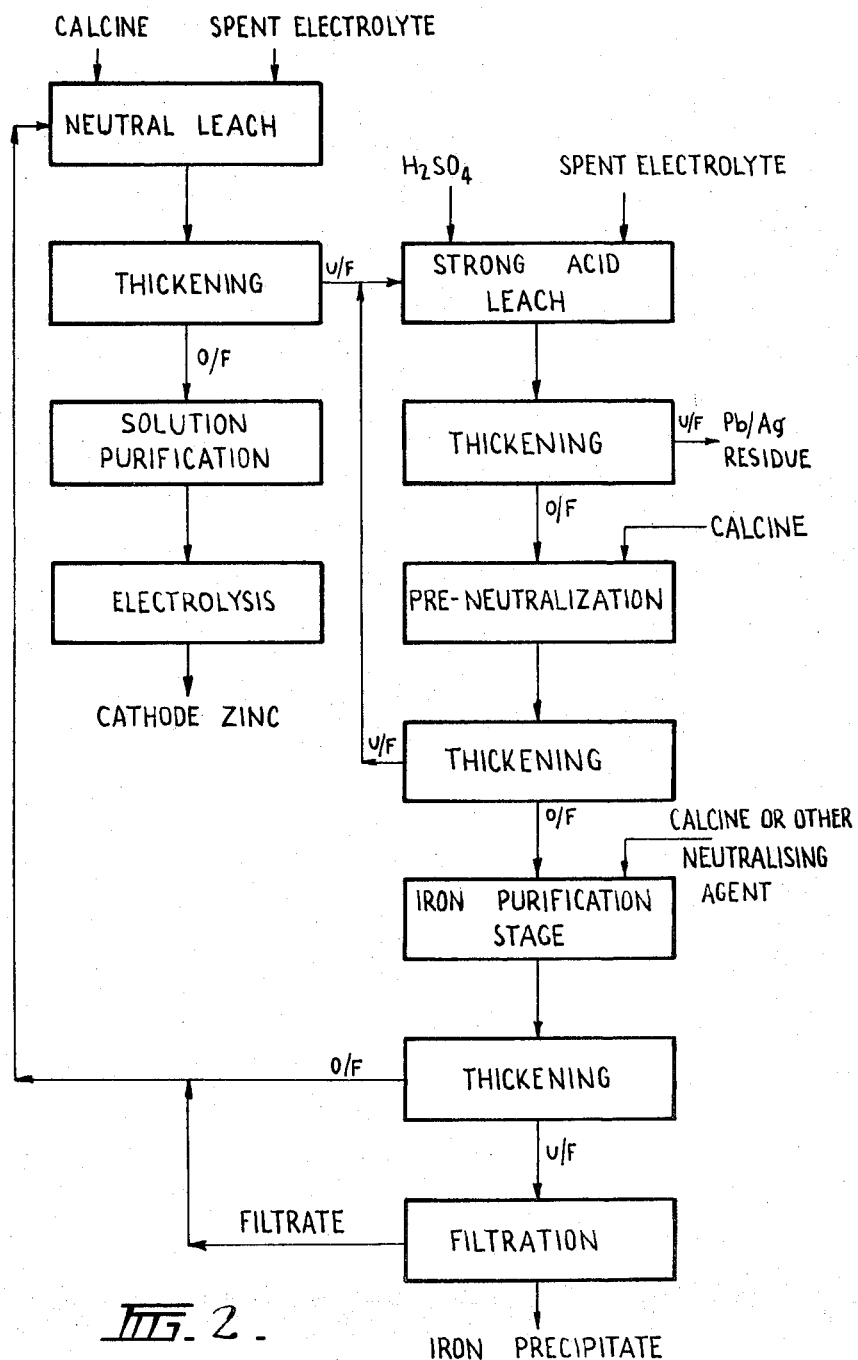

In another application of the process of this invention, calcine can be leached in a counter-current leaching procedure so that attack of substantially all of the zinc ferrite contained in the calcine is obtained. FIG. 2 of the accompanying drawings illustrates one way in which this may be accomplished.

In this procedure spent electrolyte is reacted with excess calcine in a neutral leaching stage operating at a pH in the range 3.5 to 5.5. After thickening or separation of the solids by standard procedures the solution is subjected to appropriate purification procedures before recovery of contained zinc by electrolysis.

Solids from the neutral leaching stage, comprising undissolved zinc oxide, zinc ferrite and any impurities precipitated in the neutral leaching stage, are then subjected to a strong leach using spent electrolyte which may be fortified with added strong sulphuric acid. The temperature, retention time, and the strength of the acid in the strong acid leaching stage are selected so that substantially all of the zinc ferrite contained in the original calcine added to the neutral leaching stage is dissolved. A final acidity greater than 20 g./l., a retention time greater than 2 hours and a temperature between 65° C. and the boiling point of the solution at atmospheric pressure are satisfactory conditions for obtaining substantial dissolution of the zinc ferrite. Any remaining zinc oxide in solids from the neutral leaching stage is easily dissolved under these leaching conditions.

Following separation, if desirable, of the undissolved solids by, for example, thickening and/or filtration, the solution can pass to a pre-neutralization stage where excess acidity remaining after the strong acid leaching stage may, if desired, be neutralized with a suitable neutralizing agent such as calcine. Any residue or undissolved calcine remaining after the pre-neutralization stage can be collected, for example, as thickener underflow, and recycled back to the strong acid leaching stage.

The leaching solution, containing dissolved ferric iron, zinc sulphate and any impurities dissolved in the acid leaching stage then passes to the iron purification stage. In this stage dissolved ferric iron is precipitated according to the process of this invention. A suitable neutralizing agent to use is calcine. The precipitated iron is then separated, for example, by thickening and filtration; both the thickener overflow and the filtrate may be returned to the neutral leaching stage for further purification.

The iron precipitates formed in the manner of this invention remove from solution significant amounts of arsenic, antimony, germanium and fluorine. As these elements are particularly troublesome in electrolytic zinc plants the ability to remove these elements from solutions is an important feature of the present invention. Under certain circumstances this method of removing these elements from solution may be the only outlet for these elements from a leaching circuit.

For example, the ability of the iron precipitate formed according to the process of the present invention to remove impurities such as arsenic, antimony, germanium and fluorine from leach solution, is particularly important in the scheme of operation, illustrated in FIG. 2. This is because impurities precipitated in the neutral leaching stage tend to redissolve in the strong acid leach and, without an outlet for these impurities in the iron purification stage, a serious build up in the concentration of these impurities in the leaching circuit would result.

To those skilled in the art it may appear that the procedure above is similar in some respects to the calcine counter-current leaching procedures as practiced in many electrolytic zinc plants. A major and important difference is that in the present scheme, the normal acid leaching stage is replaced by a more aggressive acid leach to dissolve the zinc ferrite in the calcine. This can be followed by a pre-neutralization stage to reduce the acidity of the leach solution, and by an iron purification stage in which dissolved ferric iron is precipitated, according to the process of the present invention. Overall zinc recoveries in the present scheme of operations would be expected to be between 96% and 98%, compared to 87% to 93% for the conventional procedures.

Figure 3:
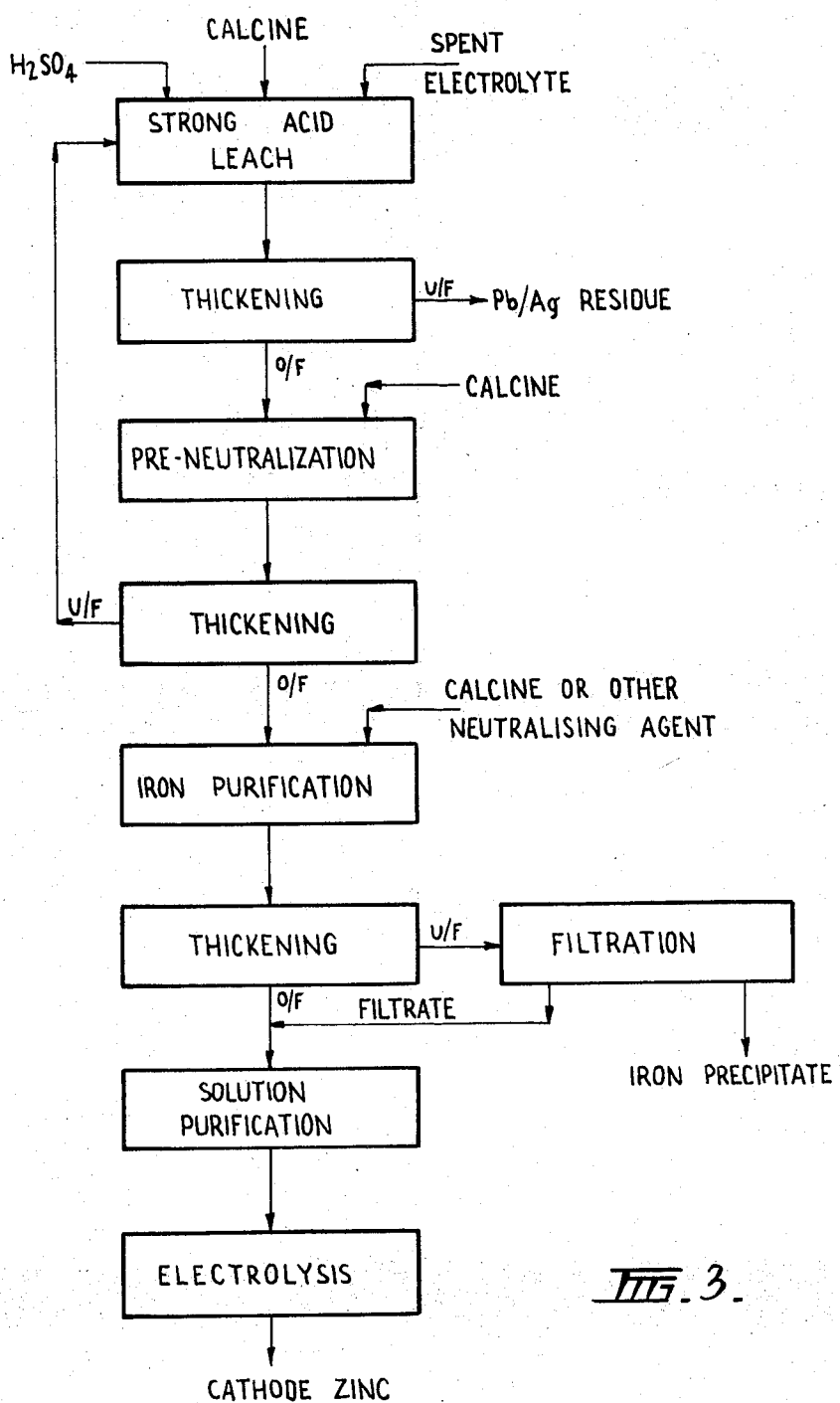

In a third application of the process of this invention, calcine may be leached in a co-current, or partially co-current, procedure so that substantial dissolution of the zinc ferrite contained in the calcine is obtained. FIG. 3 of the accompanying drawings illustrate one way in which calcine may be so leached and the process of this invention operated.

In the procedure illustrated in FIG. 3, calcine is leached in spent electrolyte, fortified if necessary with strong sulphuric acid, at a temperature between 65° C. and the boiling point at atmospheric pressure. The quantities of calcine, spent electrolyte and strong sulphuric acid are selected so that the free acidity at the end of the leaching stage is greater than 20 g./l., and preferably greater than 35 g./l., so that substantial dissolution of the zinc ferrite contained in the calcine occurs. A retention time in excess of about 2 hours is normally required to dissolve the zinc ferrite. Zinc oxide in calcine is easily dissolved under these conditions.

Following separation of the undissolved residue, if desirable, by, for example, thickening and/or filtration, the excess acidity in the leach solution may, if desired, be neutralized, preferably by the addition of further calcine, in a pre-neutralization stage. Any undissolved calcine and residue derived from the calcine added in this stage may be collected, for example, as thickener underflow and recycled back to the leaching stage.

The solution containing ferric iron dissolved in the leaching stage then passes to the iron purification stage. In this stage dissolved ferric iron is precipitated according to the process of the present invention. A suitable neutralizing agent to use is calcine. The precipitated iron is then separated by, for example, thickening and filtration of the thickener underflow. The thickener overflow and the filtrate then proceed to additional purification stages before recovery of contained zinc by electrolysis.

In the calcine leaching procedure described above, and illustrated in FIG. 3, the majority of the calcine used is added initially to the strong acid leaching stage and only a relatively small proportion of the calcine is added to the pre-neutralization stage.

Figure 4:
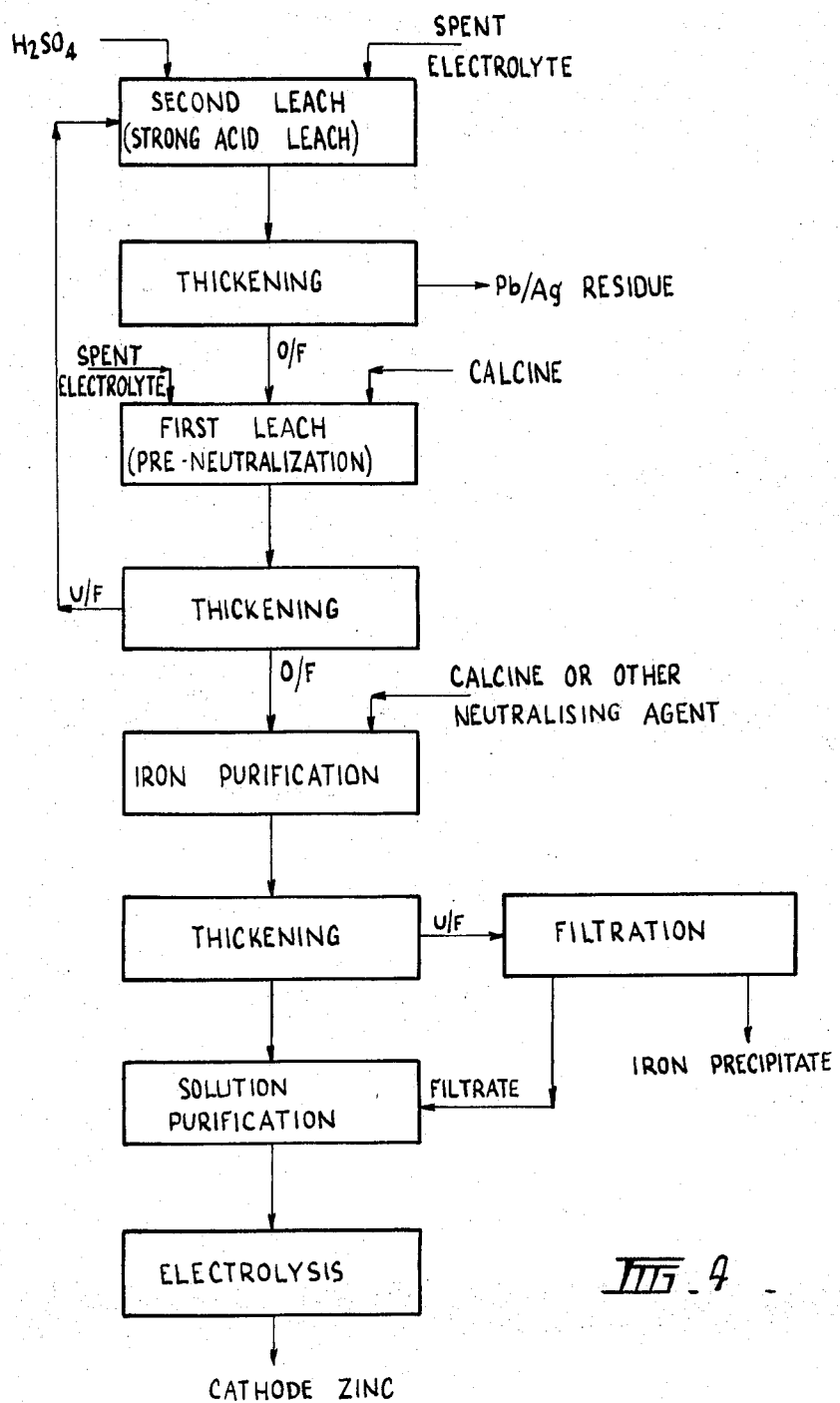

In yet another application of the process of this invention the majority of the calcine to be leached can be added, initially, to the "pre-neutralization" stage of the procedure as illustrated in FIG. 4 and none added to the strong acid leaching stage. Following the thickening stage, the undissolved solids are recycled back to the strong acid leach to dissolve any remaining zinc oxide together with the zinc ferrite originally present in the calcine. In other respects the scheme is similar to that illustrated in FIG. 3.

Thus, depending on economic circumstances, the majority, or any other proportion, of the calcine to be treated may be added, initially, to the "pre-neutralization" stage of the procedure illustrated in FIG. 3. Irrespective of the proportion of calcine added to the "pre-neutralization" stage this method of calcine leaching produces a solution suitable for application of the present invention.

The procedures, described above and illustrated in FIGS. 1, 2 and 3, for leaching calcine and residue and precipitating dissolved ferric iron from the leach solutions have been described for continuous operation as a matter of convenience. However, applications of this invention are not restricted to continuous operation, and batchwise operations of the procedures are to be considered as being within the scope of the present invention.

The procedures described in the text and illustrated in FIGS. 1, 2 and 3 includes separation of the undissolved solids remaining after the strong acid leaching stage. Under most circumstances, separation of these solids will be desirable as they will contain substantially all of the lead, silver and gold originally present in the calcine or residue being leached.

However, if the amounts of these metals present in the undissolved solids is insufficient to justify separation of the solids from the leach solution then the separation step may be omitted from the procedures described.

During the leaching of zinc plant residue or calcine and the purification of the leach solutions containing dissolved ferric iron according to the present invention some ferrous iron may be formed. Such ferrous iron may with advantage be oxidized to ferric iron by any of several methods known to those skilled in the art.

The iron precipitate obtained by operation of the process of this invention normally contains some zinc. The amount of zinc present in the precipitate will vary depending on the pH of precipitation, the type of neutralizing agent used, the filtration properties of the precipitate and the degree of washing possible.

For example, when using a calcine containing 58% Zn and 9.0% Fe as the neutralizing agent, we have obtained iron precipitates with the following range of compositions (dry basis):

|  | Percent |
| --- | --- |
| Total zinc | 4–13 |
| Water soluble zinc | 0.1–2.0 |
| Ferritic zinc | 4–8 |
| Fe | 38–41 |
| $SO_4$ | 9–18 |
| $H_2O$ | 34–38 |

The lowest $SO_4$ assays were reported in samples precipitated at 95° C.

It should be noted that the relatively high total zinc contents of the precipitates listed above for sulphate solutions are due to the use for pH control of calcine containing substantial quantities of zinc ferrite. At the pH levels studied zinc ferrite is not soluble, and it reports with the precipitated solids.

Depending on circumstances some repulping of the precipitate in dilute acid may be advantageous. Such a repulping stage to reduce the loss of zinc in the iron precipitate is to be considered as falling within the scope of the present invention.

The most suitable neutralizing agent to use will vary depending on particular circumstances. In zinc hydrometallurgy suitable neutralizing agents are, for example, zinc oxide fume, zinc oxide calcine, zinc silicate, zinc carbonate, basic zinc sulphate or limestone. We have found that zinc oxide calcine produced by roasting zinc sulphide concentrate in a fluid bed roaster is a particularly suitable neutralizing agent.

The neutralizing agent may be added as a slurry or as a dry solid. More efficient utilization of the neutralizing agent will be obtained if the reagent is finely divided.

In other applications the process of this invention can be used to separate dissolved ferric iron from chloride solutions or from solutions containing both chlorides and sulphates.

One such solution can be produced, for example, by leaching nickel-bearing laterites in hydrochloric acid. The resulting solution will contain ferric chloride, nickel chloride and dissolved impurities such as magnesium.

Substantially all of the dissolved ferric iron can be precipitated by the method of the present invention by the addition of a suitable neutralizing agent, for example, magnesium oxide. The iron precipitate can then be separated by standard procedures and the solution treated by known procedures to separate the magnesium and to recover the nickel.

By way of illustration we quote the following examples of the application of the invention:

EXAMPLE 1

Zinc plant residue containing 21.5% Zn and 31.0% Fe was leached in dilute sulphuric acid for 6 hours at 90° C. At the end of this time the slurry was allowed to stand and the leach solution decanted from the settled solids. The composition of the leach solution was as follows: Zn 23.0 g./l., $Fe^{3+}$ 25.0 g./l., $H_2SO_4$ 15.5 g./l., As 196 mg./l., Sb 5.0 mg./l., Ge 0.07 mg./l., F 5.0 mg./l.

The leach solution was pumped continuously at a rate of 0.53 gal./hour into the first of three steam jacketted mechanically agitated, baffled stainless steel reaction vessels arranged in series so that the pulp from the first vessel overflowed into the second vessel, and pulp from the second vessel in turn overflowed into the third vessel. The volume of each vessel was 6.3 litres.

A slurry of 500 g./l. of 35% minus 200 Tyler mesh fluid roasted calcine suspended in zinc sulphate solution containing 110 g./l. zinc was metered into the first reaction vessel by means of a bucket feeder. The volume of neutralizing pulp added was controlled by a signal from a pH meter, the electrodes of which were suspended in the first reaction vessel. Analysis of the calcine was as follows: Zn 58.0%, Fe 9.1%, Pb 1.7%.

The temperature of the three vessels and their contents was controlled at 70° C. by the injection of steam into the vessel jackets. Operation of the steam valves was controlled automatically by means of contact thermometers suspended in each vessel.

The pH of the pulp in the first vessel was controlled at 2.4 measured at 70° C.

Once the process had been operating for 10 hours and steady state conditions had been established, samples of pulp from the three vessels were collected, a measured quantity of a flocculating agent added and settling and filtration tests conducted.

With a flocculant addition of 0.2 lbs. per ton of solids initial settling rates of 3 cm./min. were obtained with samples from the first vessel, 2.5 cm./min. for samples from the second vessel and 1.9 cm./min. for samples from the third vessel.

The flocculated samples were allowed to stand overnight, the substantially clear supernatant liquid was then decanted and filtration tests conducted on the thickened pulps.

The filtration rates at ambient temperatures of thickened pulps of S.G. 1.4 as measured on a A12.5 cm. diameter Büchner funnel with a vacuum of 20 inches of mercury were: 1.0 ton per sq. ft. per day of dry solids for a cake thickness of 5 mm. for pulp from the first vessel; 0.70 ton per sq. ft. per day of dry solids for pulp from the second vessel and 0.55 ton per sq. ft. per day of dry solids for pulp from the third vessel.

The filtered solids were then washed, dried and analyzed. The solids from the three vessels had very similar composition. The average composition was as follows: T/Zn 7.9%, W/Zn 0.33%, Fe 40.0%, $SO_4$ 16.5%, As 0.25%, Ge 0.0005%, Cl 0.004%, Na 0.11%, K 0.10%, $NH_4$ not detected.

The concentration of ferric iron in filtrates from the three vessels were 1.2, 0.8 and 0.7 g./l. respectively. In other respects the composition of the filtrates from the three vessels were very similar. The average composition was as follows: Zn 80.0 g./l., As 0.4 mg./l., Sb 0.8 mg./l., Ge 0.05 mg./l., F 3.4 mg./l.

The calcine consumption was 2.8 grams of calcine per gram of iron precipitated.

EXAMPLE 2

A series of experiments using the equipment described in Example 1 was conducted. Solution similar to that used in Example 1 was pumped into the first vessel at rates of 40, 60 or 80 cc./min. The pH of the pulp was maintained at either 2.4, 2.7 or 3.0, while the temperature of the pulp was maintained at 50° C., 70° C. or 95° C. respectively.

Settling tests and filtration tests similar to those described in Example 1 were conducted on samples taken from the first vessel. The results of these tests, together with solution and solid assays and other data are listed in Table 1.

TABLE 1

| Temp., °C. | pH | Retention time, hrs. | Settling rate, cm./min. | Filtration rate, gal/sq.ft./min. | Composition of washed solids, percent | | | | Composition of filtrate (g./l.) $Fe^{3+}$ |
|---|---|---|---|---|---|---|---|---|---|
| | | | | | Total Zn | Water soluble Zn | Fe | $SO_4$ | |
| 95 | 2.4 | 1.35 | 3.3 | 0.17 | 9.2 | 0.7 | 41.0 | 12.5 | 0.7 |
| 95 | 2.4 | 2.70 | 2.1 | 0.10 | 8.2 | 0.6 | 41.1 | 12.1 | 0.4 |
| 70 | 2.4 | 1.35 | 1.4 | 0.09 | 8.0 | 0.3 | 40.0 | 16.5 | 1.2 |
| 70 | 2.4 | 1.75 | 1.8 | 0.07 | 4.9 | 0.2 | 40.2 | | 0.4 |
| 70 | 2.4 | 2.70 | 2.3 | 0.15 | 9.8 | 0.3 | 38.6 | 17.9 | 1.0 |
| 50 | 2.4 | 1.8 | Poor | | 14.3 | 3.1 | 29.3 | 27.5 | 1.8 |
| 95 | 2.7 | 1.35 | 2.5 | 0.15 | 10.5 | 0.7 | 39.5 | 9.9 | 0.1 |
| 95 | 2.7 | 2.70 | 2.0 | 0.27 | | | | | 0.5 |
| 70 | 2.7 | 1.35 | 1.3 | 0.29 | 8.6 | 9.0 | 39.6 | 14.9 | 0.3 |
| 70 | 2.7 | 2.70 | 1.8 | 0.28 | 8.4 | 0.91 | 38.2 | 13.9 | 0.8 |
| 95 | 3.0 | 1.35 | 5.3 | 0.05 | 8.9 | 0.72 | 38.9 | 13.2 | 0.5 |
| 95 | 3.0 | 1.8 | 5.3 | 0.09 | 12.6 | 0.54 | 40.0 | 10.1 | 0.4 |
| 95 | 3.0 | 2.70 | 2.4 | 0.08 | 11.9 | 0.50 | 41.0 | 9.6 | 0.2 |
| 70 | 3.0 | 1.35 | 3.2 | 0.17 | 10.7 | 1.46 | 39.7 | 11.8 | 0.1 |
| 70 | 3.0 | 2.70 | 5.7 | 0.23 | 9.4 | 1.7 | 40.0 | 12.4 | 0.1 |

EXAMPLE 3

Using the equipment described in Example 1 a further test was conducted using feed solution of the following composition: Zn 113.4 g./l., $Fe^{3+}$ 7.2 g./l., $Fe^{2+}$ 0.18 g./l., $H_2SO_4$ 17.8 g./l. This solution was pumped into the first vessel at a rate of 160 cc./min., giving a nominal retention time of 39 minutes per vessel.

As in Example 1, the pH of the pulp in the first vessel was controlled at 2.4 by the automatic addition of fluid roasted calcine suspended in zinc sulphate solution. The temperature of the three vessels was controlled at 70° C.

When steady conditions had been established after operating for several hours samples were taken from the three vessels. A flocculating agent was added and settling tests conducted. Initial settling rates for samples from vessels 1, 2 and 3 were 1.5, 1.8 and 2.0 cm./min. respectively.

The settled pulps were filtered, washed, dried and analyzed. Filtrate and solid assays are reported below.

TABLE 2

| Vessel number | 1 | 2 | 3 |
|---|---|---|---|
| Filtrate in g./l.: | | | |
| $Fe^{3+}$ | 1.5 | 1.4 | 1.0 |
| $Fe^{2+}$ | 0.45 | 0.48 | 0.45 |
| Zn | 133.0 | 135.0 | 127.2 |
| Solids, percent: | | | |
| Total Zn | 9.7 | 8.4 | 8.8 |
| Water sol. Zn | 1.0 | 0.20 | 0.6 |
| Water sol. Fe | 29.4 | 30.7 | 30.2 |
| Water sol. $SO_4$ | 25.2 | 26.3 | 26.9 |

EXAMPLE 4

A synthetic solution of composition similar to that which might be produced by leaching nickel bearing laterites in hydrochloric acid was prepared. The composition of the solution was as follows: Ni 7.4 g./l., Ferric iron 54.0 g./l., Mg 30.0 g./l., HCl 7.7 g./l.

This solution was metered at a constant rate of 37 cc./min., into a 5 litre agitated beaker fitted with a constant level siphon tube. A slurry of finely divided magnesium oxide in water was added manually as required to maintain the pH of pulp in the beaker within the range 2.1 to 2.3. The temperature of the pulp was maintained at 70° C. by placing the beaker on a thermostatically controlled hot plate.

Samples of pulp were taken after several hours of operation when steady state conditions had been established, a small quantity of flocculating agent added and settling and filtration tests conducted. Initial settling rates of up to 4 cm./min. were obtained while filtration rates of the settled pulps were in the range 1.0 to 1.7 tons per square foot per day of dry solids for a vacuum of 20 inches of mercury.

Analysis of the washed and dried solids was as follows: Ni 0.18%, Mg 0.72%, Fe 43.8%, Cl 4.2%.

Filtrate analyses were as follows: $Fe^{3+}$ 0.65 g./l., Ni 4.4 g./l., Mg 33 g./l.

EXAMPLE 5

A synthetic solution containing both $SO_4$ and Cl ions, was prepared by dissolving the solids precipitated in Example 1 in hydrochloric acid. The composition of the filtered solution was as follows: $Fe^{3+}$ 23.4 g./l., $SO_4$ 22.1 g./l., free HCL 6.7 g./l.

This solution was metered at a constant rate of 25 cc./min. into a 5 litre agitated beaker fitted with a constant level siphon tube. A slurry of finely divided magnesium oxide in water was added manually as required to maintain the pH of the pulp in the beaker within the range 2.3 to 2.5. The temperature of the pulp was maintained at 70° C.

After several hours, when steady state conditions had been established, samples of pulp were collected, a small quantity of a flocculating agent added and settling and filtration tests conducted. Initial settling rates of up to 10 cm./min. were obtained, while filtration rates of the settled pulps were in the range 0.8 to 1.7 tons per square foot per day of dry solids for a vacuum of 20 inches of mercury.

Analysis of the washed and dried solids was as follows: Fe 47.0%, Cl 1.0%, $SO_4$ 10.2%.

The ferric iron concentration in the filtrate was 0.085 g./l.

What is claimed is:

1. A process for removing ferric iron from an acidic solution containing dissolved ferric iron and comprising also dissolved zinc, comprising the step of adding said solution and a neutralizing agent to an agitated vessel and precipitating the ferric iron in a readily settlable and filterable form by maintaining in said vessel (a) the concentration of dissolved ferric iron at all times at less than one gram per litre (b) the temperature within the range 50° C. to its boiling point at atmospheric pressure and (c) the pH within the range 1.7 to 3.5.

2. The process of claim 1 wherein the temperature of the solution is maintained within the range 65° C. to 95° C.

3. The process of claim 1 wherein the pH of the solution is maintained within the range of 2.0 to 3.0.

4. The process of claim 1 wherein the aqueous solution is produced by the acid leaching of zinc plant residues comprising zinc ferrite.

5. A process for removing ferric iron from an acidic solution containing dissolved ferric iron and comprising also dissolved nickel, comprising the step of adding said solution and a neutralizing agent to an agitated vessel and precipitating the ferric iron in a readily settlable and filterable form by maintaining in said vessel (a) the concentration of dissolved ferric iron at all times at less than one gram per litre (b) the temperature within the range 50° C. to its boiling point at atmospheric pressure and (c) the pH within the range 1.7 to 3.5.

6. A process for removing ferric iron from an acidic solution containing dissolved ferric iron and comprising also dissolved one of the cation selected from the group consisting of copper and cobalt, comprising the step of adding said solution and a neutralizing agent to an agitated vessel and precipitating the ferric iron in a readily settlable and filterable form by maintaining in said vessel (a) the concentration of dissolved ferric iron at all times at less than one gram per litre (b) the temperature within the range 50° C. to its boiling point at atmospheric pressure and (c) the pH within the range 1.7 to 3.5.

References Cited

UNITED STATES PATENTS

| 2,899,300 | 8/1959 | Bailey | 75—101 R |
| 1,467,516 | 9/1923 | Jainton | 75—101 R |
| 1,173,467 | 2/1916 | Titus et al. | 75—108 |
| 3,203,786 | 8/1965 | Wesolowski | 75—108 |

OSCAR R. VERTIZ, Primary Examiner

H. S. MILLER, Assistant Examiner

U.S. Cl. X.R.

75—101 R, 108; 423—633